United States Patent [19]

Gray

[11] 4,406,550

[45] Sep. 27, 1983

[54] TEMPERATURE MONITORING AND UTILIZATION SYSTEM

[75] Inventor: Michael J. Gray, Phoenix, Ariz.

[73] Assignee: Lane S. Garrett, Scottsdale, Ariz.

[21] Appl. No.: 228,798

[22] Filed: Jan. 26, 1981

[51] Int. Cl.³ .......................... G01K 3/02; G01K 7/14
[52] U.S. Cl. .................................... 374/110; 374/111; 374/170; 374/179
[58] Field of Search ................. 73/341, 340; 307/310, 307/364; 374/111, 113, 170, 167, 144, 109

[56] References Cited

U.S. PATENT DOCUMENTS

| | | | |
|---|---|---|---|
| 3,814,957 | 6/1974 | Way | 307/310 |
| 4,109,235 | 8/1978 | Bouthors | 340/52 F |
| 4,114,442 | 9/1978 | Pratt | 374/113 |
| 4,117,670 | 10/1978 | Dombkowski et al. | 307/310 X |
| 4,122,720 | 10/1978 | Podl | 340/57 F X |
| 4,209,774 | 6/1980 | Bendler | 374/170 X |
| 4,298,947 | 11/1981 | Tamura et al. | 374/170 X |

*Primary Examiner*—Daniel M. Yasich

*Attorney, Agent, or Firm*—LaValle D. Ptak

[57] ABSTRACT

A temperature monitoring and display system is used in conjunction with two or more low temperature sensors which produce output currents representative of the temperature being sensed. The currents produced are converted to voltages and applied through differential amplifier circuits to produce output analog signals representative of the sensed temperatures. These signals also are applied to a differential comparator which produces an output signal having a sign and magnitude representative of the difference in the sensed temperatures. A switch is used to select any one of the outputs of the first and second differential amplifiers or the comparator and to apply this output signal to an analog-to-digital converter, the outputs of which then are used to drive a suitable digital display. The output of the comparator itself also may be applied to a suitable utilization circuit and to alarm threshhold detectors to indicate conditions when the temperature relationships sensed by the two sensors exceeds some preestablished relationship.

7 Claims, 1 Drawing Figure

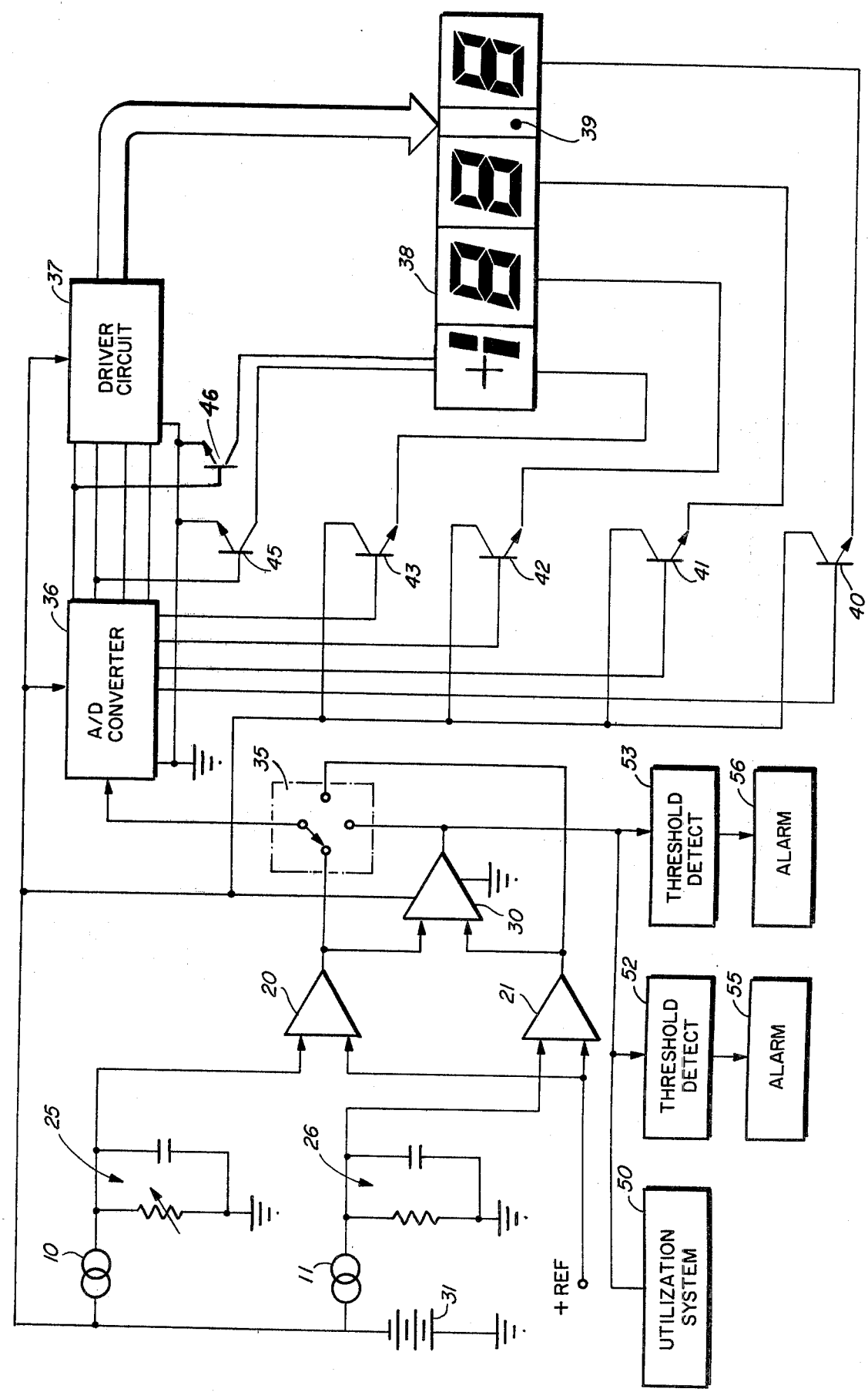

TEMPERATURE MONITORING AND UTILIZATION SYSTEM

BACKGROUND OF THE INVENTION

A number of applications exist for monitoring temperatures at different locations in a system and then either displaying the various monitored temperatures or utilizing these temperatures to control the operation of the system in a particular manner dependent upon the relationship of the temperatures being monitored. Typical examples are in the field of monitoring the temperatures in a plurality of zones in an aircraft engine, monitoring the operating temperatures of various cylinders of an internal combustion engine or diesel engine, monitoring temperatures inside and outside a building, and the like.

In their simplest form, temerature monitoring devices, in the general category discussed above, exist in the form of the well known indoor/outdoor thermometers. Generally, such thermometers employ dual analog displays, each activated by a different sensor, one located inside the room in which the display is located and the other located outside the room. Such a simple device actually is nothing more than two independent temperature sensor/display units, with the displays conveniently located at a single place.

More sophisticated temperature monitoring systems exist for providing temperature displays indicative of the operating conditions of engines, for example of the type used in aircraft. One such system is disclosed in the patent to Pratt, U.S. Pat. No. 4,114,442, issued Sept. 19, 1978. The Pratt patent is used to continuously and automatically monitor and alternately display exhaust gas temperature, cylinder head temperature, and turbine inlet gas temperature data to the pilot of an aircraft. In the system of the Pratt patent, temperature sensors are located in different temperature monitoring zones within the aircraft engine. These sensors comprise thermocouples operating at the extremely high temperatures encountered in an aircraft engine (on the order to 1,000° F. or higher) and generate voltages which then are applied to the monitoring system to produce output indicia of the temperature of the various zones in which the sensors are located. The temperature monitoring system of the Pratt patent also includes a circuit for automatically and sequentially scanning the various sensor output signals; so that they are displayed to the pilot in a predetermined pattern. Since, in many cases, it is possible to detect the malfunctioning of an aircraft engine when its temperature exceeds some predetermined maximum at some point in the engine, the Pratt system includes an alarm which is activated at any time the threshold temperature detected by the sensor connected with the alarm exceeds a temperature which previously has been determined as a maximum operating temperature for that zone of the engine. In addition, the system also actuates an alarm whenever the difference between the hottest and coldest exhaust gas temperatures from different engines exceeds a preestablished value.

The system of the Pratt patent, however, must employ thermocouples because of the high temperatures encountered and no negative temperatures are sensed or displayed by the system. Thermocouples have serious corrosion problems; and because they are voltage generators, generating voltages in the millivolt range, the sensor must be located as near as possible to the display panel. This is necessary to avoid the introduction of substantial errors in the data displayed as a result of resistance losses in the interconnections between the thermocouple and the display panel.

Other patents which are generally related to the field of the present invention include the patents to Smith, U.S. Pat. No. 2,445,156, issued July 13, 1948; Hoffman, U.S. Pat. No. 3,077,775, issued Feb. 19, 1963; and, Podl, U.S. Pat. No. 4,122,720, issued Oct. 31, 1978.

The Smith patent is directed to a system for measuring temperature differences between the cooling water and the exhaust temperature for the different cylinders of a diesel engine. As in the Pratt patent, thermocouples are used as the temperature sensors to generate voltages indicative of the temperatures in the various zones where the thermocouples are located. Smith recognized the problem inherent with the use of thermocouples as a result of the resistance of the wires connecting the sensors with the reading panel of the instrument and attempted to overcome the difficulty by making all of the lead wires from all of the thermocouples exactly the same length. This requires a very precise installation; and, obviously, if repairs subsequent to the initial installation later are made, it is necessary to observe this critical restriction or erroneous information will be displayed by the system thereby substantially reducing its effectiveness or actually making it unreliable for its intended purpose. Once again, the Smith patent system is useful only in relatively high temperature application.

The Podl patent is similar to the Smith patent and is directed to a temperature monitoring system for a diesel engine which has sequential monitoring of the sensors associated with different cylinders by means of a multiplexing system. The signals from the temperature sensors (again thermocouples with all of their inherent disadvantages) are connected to comparator circuits, and an alarm is sounded if the temperature sensed is outside of some preestablished limit determined by a reference signal supplied to the comparator circuitry. Generally, the alarm is activated in response to a high temperature condition over some preestablished "safe" threshold. The system also provides an alarm for a deviation in temperature, either above or below some preestablished norm, and also for a temperature which is more than some preestablished amount below a preestablished set point.

The Hoffman patent is of general interest for a system utilizing thermocouples or other input devices for sequentially scanning various inputs and connecting them to a common output circuit. For temperature inputs, Hoffman, as with the above discussed patents, employs voltage generating thermocouples; so that Hoffman also is subject to the disadvantages of such systems and the limitations which thermocouple sensors produce in any system with which they are used.

Other multiple temperature sensing systems which are used for various applications in the prior art include the systems disclosed in the patents to Vidts, U.S. Pat. No. 3,404,570, issued May 25, 1966; Tsoras, U.S. Pat. No. 3,688,295, issued Aug. 29, 1972; Sarafin, U.S. Pat. No. 2,900,820, issued Aug. 25, 1959; and, Nitschke, U.S. Pat. No. 4,130,019, issued Dec. 19, 1978.

The Vidts patent discloses a system for sensing multiple temperatures at separated sensing zones and also displaying the temperature difference between different zones. The Sarafin patent is similar in its application to the indoor/outdoor thermometers discussed previously, but is directed to a differential oral thermometer for use with medical patients. The Tsoras et al patent discloses yet another plural thermocouple temperature monitoring system in which the multiple sensors are connected individually to different comparators. The outputs of the various comparator circuits then are connected in common to operate an alarm if any one of the input temperatures which are sensed is in excess of some maximum established by the reference signal applied to the various comparators. The system disclosed in the Nitschke patent also is a thermocouple system (with all of the disadvantages of such sensors) which has a number of outputs applied through a multiplexer to a computer for further processing. In the computer, operations are made to nullify offset errors of various portions of the circuit electronics and to correct for the inherent errors introduced into such a monitoring system by the cold junction of the thermocouples used.

None of the foregoing systems permit the alternative sensing and displaying of both positive and negative temperatures by any one or more of the temperature sensor/display devices utilized. In addition, the comparative temperature systems which are known in the prior art generally employ thermocouple sensors; so that they are limited to operating in high temperature environments and cannot mix positive and negative temperature sensing for utilization in the same system.

It is desirable to provide a system capable of operating at relatively low temperatures, which is not subject to the inherent limitations of thermocouple temperature sensing systems, and which further is capable of displaying positive and negative temperatures. In addition, the system should be capable of providing output difference signals indicative of the amount of temperature difference between two sensors and also indicative of which of those sensors is at a higher temperature than the other.

SUMMARY OF THE INVENTION

Accordingly, it is an object of this invention to provide an improved temperature monitoring system.

It is another object of this invention to provide an improved temperature monitoring system capable of monitoring both positive and negative temperatures.

It is an additional object of this invention to provide an improved temperature monitoring system capable of providing output signals representative of the positive and negative temperature differences between two temperature sensors.

It is a further object of this invention to provide a temperature monitoring system which is substantially unaffected in its operation by the distance and type of electrical connections between the utilization unit and the sensors used in the system.

In accordance with a preferred embodiment of this invention, a system for monitoring the temperature at a plurality of points and utilizing the temperature data which is monitored includes at least first and second temperature sensors. The sensors are located in a different temperature zone which is to be monitored and produce corresponding signals which are representative of the monitored temperatures in such zones. A switch has a common output terminal and input terminals connected to the respective outputs of the temperature sensors to produce an output signal which corresponds to the signal selected by the switch from the output of the first and second temperature sensors. The output of the switch then is coupled with a utilization system, such as a temperature display or a control system operated in response to the signals applied to it from the output of the switch.

In a more specific embodiment, the utilization system comprises a digital temperature display for displaying both positive and negative temperatures and the temperature sensors are low temperature, current generator sensors.

BRIEF DESCRIPTION OF THE DRAWING

The single FIGURE of the drawing is a schematic diagram of a preferred embodiment of the invention.

DETAILED DESCRIPTION

Reference now should be made to the drawing, which is a block diagram of a temperature sensing, monitoring and control system in accordance with a preferred embodiment of the invention. The system comprises a number of current generator, low temperature sensors, two of which are indicated as current generator sensors 10 and 11. Each of these sensors is positioned in a different temperature zone to be monitored by the system. For example, typical applications would be to mount one of the sensors inside a building and the other outside a building for providing a ready display of and comparison of the temperatures at these two locations. Other applications include the spacing of the sensors 10 and 11 in different locations inside an office building, for example, on the south and north sides for the purpose of controlling and balancing the heating and cooling systems used in such a building to offset the unbalance created by natural causes, such as sunlight.

Other applications include the sensing of input air temperature and output air temperature from a furnace, the sensing of water temperature in a solar collector and the temperature of the return water from a solar system to turn on the system pumps when the solar collector water temperature is higher than the return water temperature, and to turn off the pumps when the reverse is true (for example, at night time or under some day time cloudy sky conditions). It often is desirable simply to monitor two different temperatures and provide a ready display of the temperatures and, for some situations, provide a display of the temperature difference and the direction or sign of that temperature difference.

The sensors 10 and 11 preferably are type AD590 sensors, manufactured by Analog Devices, or their equivalent. These sensors provide a fairly accurate analog current generation which tracks the temperature of the zone in which the sensors are located. Each of the sensors 10 and 11 is connected to the input of a corresponding one of a pair of differential amplifiers 20 and 21, through integrating circuits 25 and 26. Each of the integrating circuits 25 and 26 includes an adjustable resistor, for initially calibrating the system, and a capacitor for causing the currents generated by the respective sensors 10 and 11 to be converted to input potentials applied to the respective differential amplifiers 20 and 21. Each of the amplifiers 20 and 21 is provided with a reference voltage selected to represent the output voltage of the sensors 10 and 11 for zero degrees centigrade (0° C.) or zero degrees farenheit (0° F.).

When the reference voltage applied to the reference terminals of the differential amplifiers 20 and 21 is selected to represent the zero degree temperatures from the sensors 10 and 11, the output signals from the amplifiers 20 and 21 will be positive or negative potentials proportional to the amount by which the temperature of the zone sensed by either of the sensors 10 and 11 is above or below the zero degree reference. A typical differential amplifier which is suitable for use for the amplifiers 20 and 21 is a National Semiconductor quad amplifier package LM324. The amplifiers 20 and 21 comprise two of the differential amplifiers of such a package. Using the temperature sensor indicated above and these amplifiers, the output voltage varies approximately ten millivolts per degree Centigrade variation of the temperature sensed by the temperture sensors 10 and 11.

A third differential amplifier of the quad package of the LM324 comprises the differential comparison amplifier 30, which has each of its two inputs connected respectively to the outputs of the amplifiers 20 and 21. The signals appearing on the output of the amplifier 30 then comprise a representation of the difference of the temperatures sensed by the sensors 10 and 11 and the sign of the voltage produced on the output of the amplifier 30 is indicative of which of the two sensors is sensing the higher temperature, irrespective of whether the temperatures sensed are both positive, are both negative, or one is negative and the other is positive. The relative difference is such that if the temperature sensed by the sensor 10 is higher than the temperature sensed by the sensor 11, the output of the differential comparator 30 is a positive potential. When the temperature sensed by the sensor 10 is lower than the temperature sensed by the sensor 11, the output of the comparator 30 is a negative potential. The magnitude of the potential, whether it is positive or negative, is directly proportional to the temperature difference and can be interpreted directly as the analog readout of that temperature difference. Again, the output potential on the output terminal of the comparator 30 varies approximately ten millivolts per degree Centigrade difference; so that this information may be directly interpreted and utilized by suitable utilization circuitry in the remainder of the system.

Direct current operating potential for the system is obtained from a suitable source, depicted in the drawing as a battery 31. The battery 31 supplies a positive potential to each of the temperature sensors 10 and 11 and also is used to supply the operating potential to the remainder of the circuits in the system. Various types of conventional direct current power supplies may be used to supply this operating potential.

To selectively apply the temperature data which is available at the outputs of the differential amplifiers 20 and 21 and the comparator 30, the outputs of each of these devices are connected respectively to a different one of three inputs of a selector switch 35. This switch is illustrated in the drawing as a rotary selector switch having a single output and a movable contact which may be placed on any one of the three inputs to connect that input with the single output. The switch 35 may be a manual switch or it may be an electronic switch. The particular type of switch which is employed is irrelevant to an understanding of the operation of the system.

For the purpose of utilizing and/or displaying the temperature data which is connected to the output of the switch 35, the output terminal is connected to a first utilization device comprising an analog-to-digital converter 36, which preferably is a Motorola MC14433 converter circuit. This circuit then provides output signals to a suitable display driver circuit 37, either directly or through an intermediary circuit, to produce output signals suitable for driving a seven segment temperature display unit 38. The utilization or display unit 38 is illustrated as including three digit displays and a "plus/minus 1" display. Utilizing a display 38, having the arrangement shown in the drawing, permits a temperature range of minus 199.9° C. to plus 199.9° C. to be displayed if one-tenth (1/10) degree increments are employed and a decimal point 39 is used as part of the display. If one degree temperature increments are to be displayed without illumination of the decimal point 39, it is obvious that a much greater range of temperatures may be covered. Typically, the temperature range which is sensed by the sensors 10 and 11 is between minus 55° C. and plus 150° C. for most applications with which the system is used.

The converter 36 also supplies appropriate enabling signals to the bases of four NPN transistors 40, 41, 42, and 43 to cause these transistors to enable the respective sections of the four different sections of the display unit 38 for energization in accordance with the particular numbers which are to be displayed at any given time. The transistors 40, 41 and 42 are connected to the three numerical display sections while the transistor 43 is connected to the "plus/minus 1" display section for permitting operation of that section. The plus and minus control is obtained from one of the outputs of the analog to digital converter 36 to control correspondingly the conductivity of an NPN transistor 45. When the transistor 45 is off or non-conductive, one or the other of the "plus" or "minus" display conditions occurs, and when the transistor 45 is conducting, the other one of these conditions occurs in the display unit 38. One more transistor 46 for the "1" digit works in the same manner as transistor 45.

The system described thus far is all that is needed for a temperature monitoring and display system to permit either automatic sequential scanning of the three different inputs to the switch 35 or manual selection of those inputs for display to be used for whatever purpose may be desired. Additional control and alarm functions, however, are attainable by connecting the output of the comparator circuit 30 with second utilization devices, such as, various control or alarm circuitry. For example, a utilization system 50 may be connected to the output of the differential comparator 30 to turn on or off the pumps of a solar energy water heater or swimming pool heater depending upon the magnitude and sign of the difference signal which is depicted by the output of the differential amplifier 30. For example, if the utilization system is used to control the operation of a solar system of any type, the system 50 could be turned on to operate the pump to circulate fluid through the solar system when the output of the differential amplifier 30 indicates that the system is obtaining energy from the solar collectors and to turn the pump off when the output of the comparator 30 indicates the reverse condition.

In addition to employing the output of the temperature difference comparator circuit 30 to control the operation of various types of systems in response to the sensed temperature difference and its sign, the output of the comparator 30 also can be applied to one or more utilization systems in the form of threshhold detectors, two of which 52 and 53 are shown in the drawing. For example, the threshhold detector 52 may be employed whenever the temperature difference sensed by the sensors 10 and 11, and as indicated by the output of the comparator 30, is positive and exceeds a preestablished magnitude. This condition means that the sensor 10 senses a temperature which is a predetermined magnitude greater than the temperature of the sensor 11 and if this is representative of a condition which it is desired to call to the attention of an operator or user of the system, the threshhold detector 52 is activated and turns on a suitable alarm 55, which may be a light, an audible alarm, a combination of the two, or some other type.

Similarly, the threshhold detector 53 may be operated in response to a preestablished magnitude of temperature difference but of the opposite sign. For example, a situation where the temperature sensed by the sensor 11 is such a preestablished amount greater than the temperature sensed by the sensor 10. This causes the signal appearing on the output of the comparator 30 to be of the opposite polarity to that described in the paragraph immediately above in conjunction with the operation of the threshhold detector 52. When this second or different temperature threshhold is exceeded, the threshhold detector 52, which may be a Schmidt trigger circuit or comparable threshhold detector, causes an alarm 56 to be activated.

The foregoing system is capable of sensing low temperatures, that is ambient temperatures of the type commonly found in buildings and encountered in solar heating systems, and the like. The system also, because it uses current generating temperature sensors, is not subject to the inherent and significant errors which are present in systems which employ thermocouples as temperature sensors. The sensors 10 and 11 may be located at some considerable distance from the remainder of the circuitry shown in the drawing, since the integrating circuits 25 and 26 may be connected in close proximity to the inputs of the differential amplifiers 20 and 21 with which they are used. Thus, the series impedences present in the connections between the sensors and the integrating circuits 25 and 26 (which, for all practical purposes, are at the same point as the input terminals to the differential amplifiers 20 and 21) have little or no adverse affect on the operation of the system. The system further displays positive or negative temperatures, and also produces an output from the comparator 30, which not only indicates the difference in the temperatures sensed by the sensors 10 and 11, but also, by the sign of the potential, is indicative of which of the two sensors is sensing the higher temperature.

Various changes and modifications will occur to those skilled in the art without departing from the scope of this invention. The system which is shown in the drawing is to be considered illustrative of the invention and not as limiting.

I claim:

1. A system for monitoring relatively low temperatures, such as ambient temperatures of the type commonly found in buildings and solar heating systems, at a plurality of points and utilizing the temperature data thus monitored including in combination:

a first temperature sensor means, at least a portion of which is located in a first zone, the temperature of which is to be monitored, for producing a first signal on an output terminal thereof representative of the temperature being monitored in said first zone;

a second temperature sensor means, at least a portion of which is located in a second zone, the temperature of which is to be monitored, for producing a second signal on an output terminal thereof representative of the temperature being monitored in said second zone;

a comparison amplifier means having first and second input terminals connected respectively to the output terminals of said first and second temperature sensor means and having an output terminal, said comparison amplifier means producing an output signal on the output terminal thereof representative of the difference in the temperatures sensed by said first and second temperature sensor means, wherein the output of said comparison amplifier means further has a positive value when said first temperature sensor means is sensing a higher temperature than said second temperature sensor means and has a negative value when said first temperature sensor means is sensing a lower temperature than said second temperature sensor means;

switch means having an output terminal and at least first, second, and third input terminals, said first input terminal of said switch means coupled to the output terminal of said first temperature sensor means, the second input terminal of said switch means coupled to the output terminal of said second temperature sensor means, and the third input terminal of said switch means coupled to the output terminal of said comparison amplifier means, said switch means having selection means for selectively coupling one of said first, second, or third input terminals with the output terminal of said switch means for producing a signal on the output terminal of said switch means corresponding to the signal appearing on the one of the first, second, or third input terminals coupled thereto by said selection means;

first utilization means having an input terminal coupled with the output terminal of said switch means for producing display of the temperature being monitored as selected by said selection means of said switch means; and second utilization means having an input terminal coupled with the output terminal of said comparison amplifier means and operated thereby to produce different results when the output of said comparison amplifier means has a positive value and when the output of said comparison amplifier means has a negative value.

2. The combination according to claim 1 wherein the temperatures monitored by said first and second low temperature sensing means are in a temperature range of −55° C. to +150° C.

3. The combination according to claim 1 wherein said first and second signals produced by said first and second temperature sensor means on the respective output terminals thereof are analog signals.

4. The combination according to claim 3 wherein each of said first and second temperature sensor means comprises a temperature sensor unit producing a variable current proportional to the temperature sensed thereby and an amplifier means producing a voltage proportional to the current sensed by the temperature sensor unit, such voltage comprising the signals appearing on the output terminals of said first and second low temperature sensor means, respectively.

5. The combination according to claim 1 wherein said first utilization means further includes an analog-to-digital converter circuit means having an input terminal and an output terminal, the input terminal of which is coupled with the output terminal of said switch means and the output terminal of said converter circuit means is coupled with said display means for producing a digital display of the temperature being monitored as selected by said selection means of said switch means.

6. The combination according to claim 1 wherein each of said first and second temperature sensor means sense both positive and negative temperatures and said utilization means includes a display means which displays positive and negative temperatures.

7. The combination according to claim 1 further including at least one threshhold detection means coupled to the output of said comparison amplifier means for producing an output signal whenever the signal appearing on the output of said comparison amplifier means exceeds some preestablished threshhold.

* * * * *